(12) United States Patent
Vazquez

(10) Patent No.: US 10,934,993 B2
(45) Date of Patent: Mar. 2, 2021

(54) APPARATUS FOR GENERATION OF ENERGY FROM OCEAN WAVES

(71) Applicant: Zspectrum Design Innovations Pty Ltd, West Pymble (AU)

(72) Inventor: Jose Luis Vazquez, Sydney (AU)

(73) Assignee: Zspectrum Design Innovations Pty Ltd, West Pymble (AU)

( * ) Notice: Subject to any disclaimer, the term of this patent is extended or adjusted under 35 U.S.C. 154(b) by 0 days.

(21) Appl. No.: 16/206,735

(22) Filed: Nov. 30, 2018

(65) Prior Publication Data

US 2019/0178225 A1   Jun. 13, 2019

Related U.S. Application Data

(60) Provisional application No. 62/593,816, filed on Dec. 1, 2017.

(51) Int. Cl.
| | |
|---|---|
| *F03B 13/00* | (2006.01) |
| *F03B 13/16* | (2006.01) |
| *H02K 7/18* | (2006.01) |
| *F03B 13/18* | (2006.01) |
| *H02K 35/02* | (2006.01) |

(52) U.S. Cl.
CPC .......... *F03B 13/16* (2013.01); *F03B 13/1845* (2013.01); *F03B 13/1855* (2013.01); *H02K 7/1876* (2013.01); *H02K 35/02* (2013.01); *F05B 2220/707* (2013.01); *F05B 2220/7068* (2013.01); *F05B 2250/231* (2013.01)

(58) Field of Classification Search
CPC .. F03B 13/16; F03B 13/1855; F03B 13/1845; H02K 35/02; H02K 7/1876; F05B 2250/231; F05B 2220/707; F05B 2220/7068
USPC ..................................................... 290/42, 53
See application file for complete search history.

(56) References Cited

U.S. PATENT DOCUMENTS

| | | | | |
|---|---|---|---|---|
| 3,696,251 A | * | 10/1972 | Last ..................... | F03B 13/1855 290/53 |
| 3,952,517 A | * | 4/1976 | Decker ................. | F03B 13/145 60/502 |
| 4,603,551 A | * | 8/1986 | Wood ..................... | B01D 61/10 417/333 |

(Continued)

*Primary Examiner* — Julio C. Gonzalez
(74) *Attorney, Agent, or Firm* — Michael D. Eisenberg

(57) ABSTRACT

An apparatus for generating energy from ocean waves, the apparatus including a first or outer section arranged to be coupled to a sea floor and a second or inner section that is at least partially received by and slidably moveable within the first section. The first section includes a float housing arranged to be located toward or at a sea surface and an armature housing extending from the float housing toward the sea floor, the float housing having one or more apertures so that a water level within the float housing is substantially similar to or follows that of the sea surface. The second section includes a float slidably received by the float housing and a stem carrying a magnetic element that extends from the float so as to be receivable by the armature housing. The arrangement is such that the float travels in substantially vertical direction within the float housing in response to movement of the sea surface thereby the armature housing being moved relative to the magnetic element to generate energy.

20 Claims, 7 Drawing Sheets

(56) References Cited

U.S. PATENT DOCUMENTS

| | | | | |
|---|---|---|---|---|
| 4,914,915 A | * | 4/1990 | Linderfelt | F03B 13/22 |
| | | | | 60/497 |
| 5,245,270 A | * | 9/1993 | Akiyama | F16C 32/0438 |
| | | | | 310/52 |
| 5,975,865 A | * | 11/1999 | Manabe | F04B 17/00 |
| | | | | 417/331 |
| 6,768,216 B1 | * | 7/2004 | Carroll | F03B 13/148 |
| | | | | 290/42 |
| 8,154,144 B2 | * | 4/2012 | Muller | H02K 3/47 |
| | | | | 290/53 |
| 8,723,353 B1 | * | 5/2014 | Franklin | F03B 13/20 |
| | | | | 290/42 |
| 9,611,831 B2 | * | 4/2017 | Duchene | F03B 11/063 |
| 2003/0226358 A1 | * | 12/2003 | Gerber | F03B 13/1845 |
| | | | | 60/495 |
| 2008/0174119 A1 | * | 7/2008 | Hu | F16C 39/066 |
| | | | | 290/55 |
| 2011/0031749 A1 | * | 2/2011 | Sapir | F03B 13/20 |
| | | | | 290/50 |
| 2013/0069368 A1 | * | 3/2013 | Park | F03B 13/16 |
| | | | | 290/53 |
| 2013/0154267 A1 | * | 6/2013 | Healy | F03B 13/24 |
| | | | | 290/53 |
| 2014/0145444 A1 | * | 5/2014 | Park | F03B 13/1845 |
| | | | | 290/53 |
| 2016/0252071 A1 | * | 9/2016 | Phillips | F03B 13/20 |
| | | | | 290/50 |

* cited by examiner

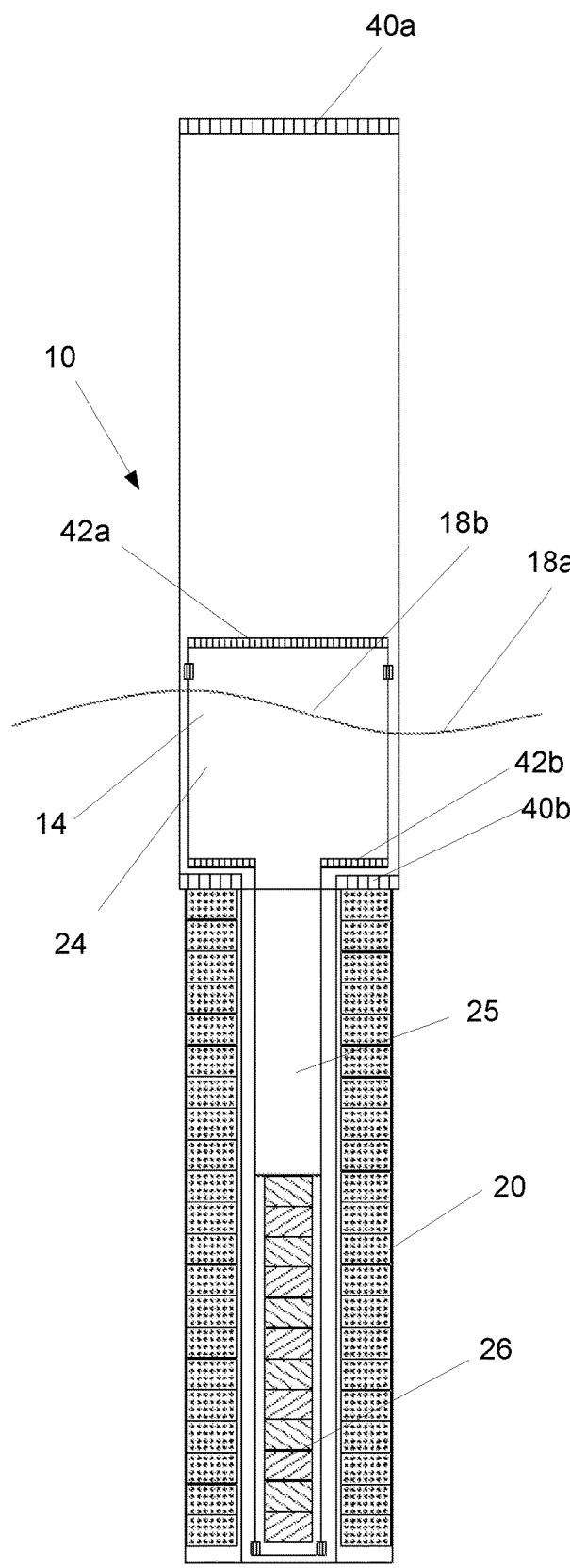
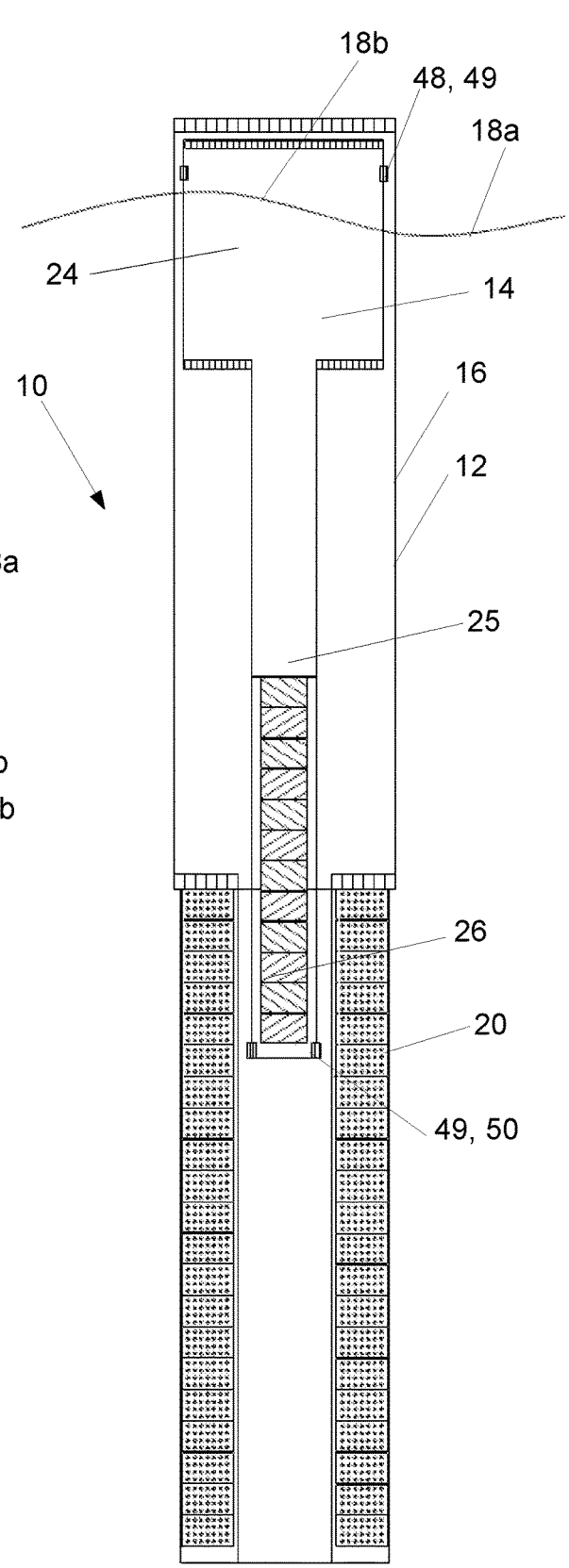
Figure 1a
Figure 1b

APPARATUS FOR GENERATION OF ENERGY FROM OCEAN WAVES

CROSS REFERENCE TO RELATED APPLICATIONS

This application claims priority from U.S. Provisional Application Ser. No. 62/593,816 filed Dec. 1, 2017, which is hereby incorporated herein by reference in its entirety.

TECHNICAL FIELD

The invention relates to an apparatus for the generation of energy form ocean waves.

BACKGROUND

The cyclical rise and fall of ocean waves may be used to generate renewable energy. Accordingly, a vast array of wave energy devices have been proposed including floating and submerged devices that move, usually oscillate, in response the waves to generated energy.

One class of wave energy devices are floating devices that typically include a float and a reaction mechanism that moves relative to the float. The reaction mechanism may include or be connected to a power take off and generation arrangement that turns the kinetic movement into, usually, electrical energy.

U.S. Pat. No. 6,791,205 discloses a reciprocating generator wave power buoy that consists of a reciprocating generator rigidly attached to the underside of an ocean buoy that creates electric power from the surface ocean swells. The generator coil maintains a stable position beneath the ocean surface while the magnetic field housing reciprocates with the vertical motion of the buoy in response to interaction with swell and waves on the surface of the ocean. The relative motion between the generator coil and the magnetic field housing is used to create electric energy.

A problem with this device relates to the complexity of the power take off mechanism, exposure of moveable parts and potential fowling, such as by marine growth, between the damper plates and the main body of the reciprocating electrical generator that may introduce friction and loss of efficiency.

The invention disclosed herein seeks to overcome one or more of the above identified problems or at least provide a useful alternative.

SUMMARY

In accordance with a first broad aspect there is provided, an apparatus for generating energy from ocean waves, the device including a first or outer section arranged to be coupled to a sea floor and a second or inner section that is at least partially received by and slidably moveable within the first section. The first section includes a float housing arranged to be located toward or at a sea surface and an armature housing extending from the float housing toward the sea floor, the float housing having one or more apertures so that a water level within the float housing is substantially similar to or follows that of the sea surface. The second section includes a float slidably received by the float housing and a stem carrying a magnetic element that extends from the float so as to be receivable by the armature housing. The arrangement is such that the float travels in substantially vertical direction within the float housing in response to movement of the sea surface thereby the armature housing being moved relative to the magnetic element to generate energy.

In an aspect, the float housing is cylindrical and the one or more apertures are provided in the form of a plurality of apertures provided substantially circumferentially around and along normally wetted wall of the float housing. The cylindrical cross section may be round or non-round such as square.

In another aspect, the float is substantially encased by the float housing.

In yet another aspect, the second section is substantially encased by the first section.

In yet another aspect, the float housing is cylindrical and the float is provided in the form of a cylindrical piston shaped to fit with and be slidable within the float housing.

In yet another aspect, opposing ends of the float housing define end of travel limits of the float In yet another aspect, the float and float housing are arranged to provide damping between one another toward the end of travel limits.

In yet another aspect, the float and float housing are arranged to at least partially seal with one another toward the end of travel limits so to as to provide pneumatic damping.

In yet another aspect, the one or more aperture are omitted from sections of the float housing proximate the end of travel limits.

In yet another aspect, the float and float housing include one or more magnetic elements arranged to repel one another toward the end of travel limits.

In yet another aspect, the first and second sections have friction reducing elements therebetween.

In yet another aspect, the friction reducing elements are provided in the form of magnetic elements between the first and section sections.

In yet another aspect, the friction reducing elements include magnetic elements located at a side wall of the float and a side wall of the stem, and magnetic elements located in side walls of the float and armature housings, respectively.

In yet another aspect, the armature housing includes a plurality of armature coils.

In yet another aspect, the armature coils are arranged contiguously. In other examples, the armature coils may be in a spaced arrangement.

In yet another aspect, the stem includes a plurality of magnetic elements arranged in alternate polarities at least partially along length of the stem.

In accordance with a second broad aspect there is provided, an apparatus for generating energy from ocean waves, the device including a first section arranged to be couped to a sea floor and a second section that is received by and slidably moveable within the first section, wherein the first section includes a float housing arranged to be located toward or at a sea surface and an electric generator housing extending from the float housing toward the sea floor, the float housing having one or more apertures so that a water level within the float housing is substantially similar to or follows that of the sea surface, and wherein the second section includes a float slidably received by the float housing and stem carrying an electric generation section that extends from the float so as to be receivable by the generator housing, wherein the arrangement is such that the float travels in substantially vertical direction within the float housing in response to movement of the sea surface thereby the electric generator housing being moved relative to the electric generation to generate energy.

In accordance with a third broad aspect there is provided, an array of wave apparatuses includes a plurality of apparatuses as defined above and herein.

In accordance with a fourth broad aspect there is provided, a method of generation of energy from ocean waves include deploying an apparatus as defined above and herein upon a sea surface and capturing energy therefrom via an energy collection station.

BRIEF DESCRIPTION OF THE FIGURES

The invention is described, by way of non-limiting example only, by reference to the accompanying figures, in which;

FIG. 1a is a side sectional view illustrating an apparatus for generating energy from ocean waves with a float at a lower travel limit of a float housing of the apparatus;

FIG. 1b is a side sectional view illustrating the apparatus with the float at an upper travel limit of the float housing of the apparatus;

DETAILED DESCRIPTION

Figure 2:
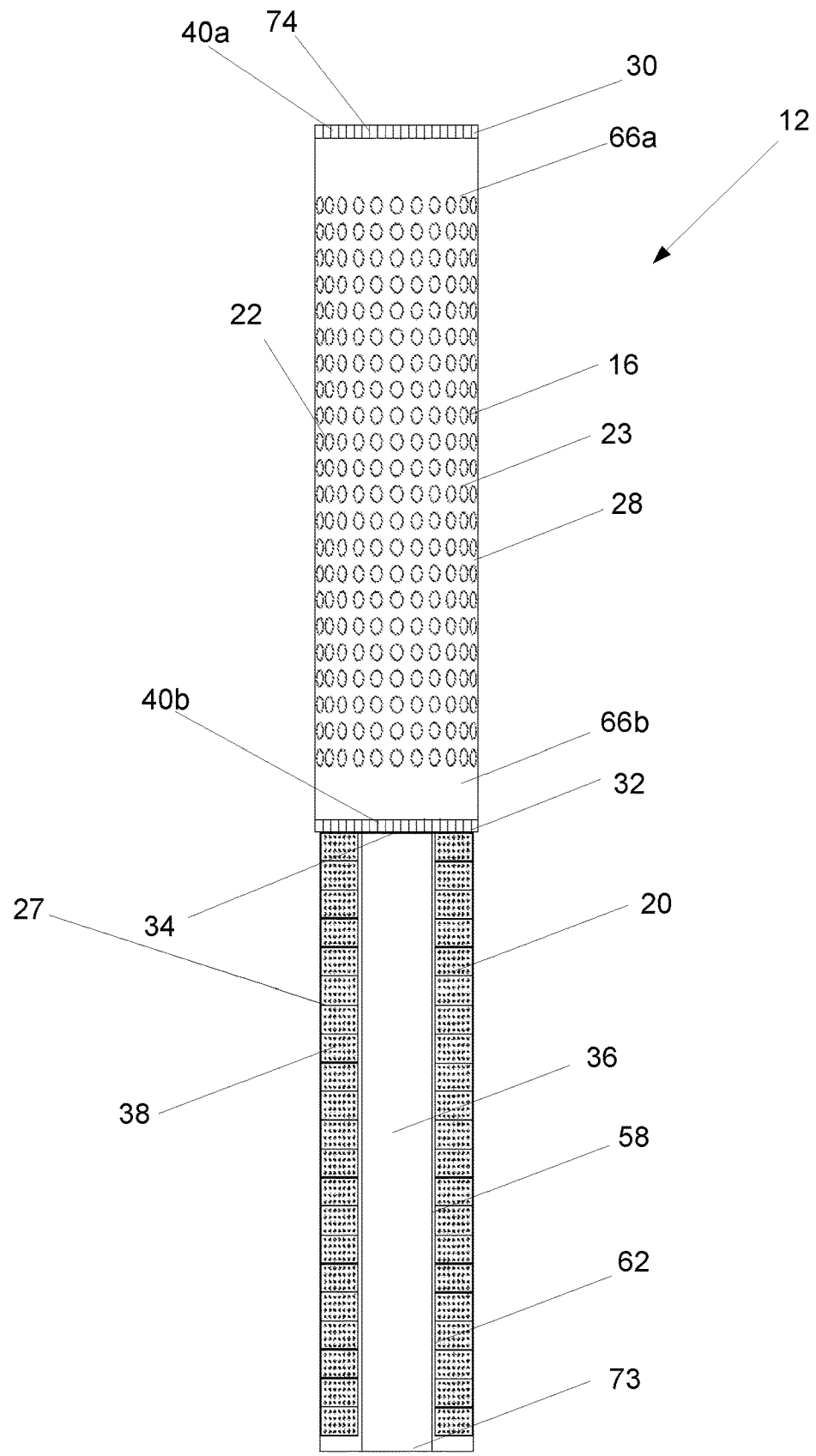
FIG. 2 is a side view illustrating a first section of the apparatus having a float housing and armature housing extending therefrom.

Referring to FIGS. 1a to 5, there is shown an apparatus 10 for generating energy from ocean waves. The apparatus 10 includes a first outer section 12 arranged to be coupled to the sea floor (not shown) and a second inner section 14 that is received by and slidably floats within the first section 12. The coupling to the seafloor may be direct or via an anchor arrangement (not shown). The first section 12 may be therefore substantially fixed or undergo some limited movement allowable by the anchor arrangement.

The first section 12 includes a float housing 16 arranged to be located toward or at a sea surface 18a and an electric generator or armature housing 20 extending from the float housing 16 toward the sea floor. The float housing 16 includes one or more apertures 22 (shown in FIG. 2) so that a water level 18b within the float housing is substantially similar to or follows that of the sea surface 18a.

The second section 14 includes a float 24 slidably received by the float housing 16 and a stem 25 carrying magnetic elements 26 that extends from the float 24 so as to be receivable by the armature housing 20. The arrangement is such that the float 24 travels in a substantially vertical direction within the float housing 16 in response to movement of the sea surface 18a thereby the armature housing 20 being moved relative to the magnetic elements 26 to generate energy.

In more detail, beginning with the first section 12 as best shown in FIG. 2, the float housing 16 has a generally cylindrical body 28 with a substantially closed top 30 and a base 32 having an aperture 34 through which the stem 25 of the second section 14 extends into the armature housing 20. The float housing 16 thereby substantially encases the float 24. It is noted the cross section the cylindrical body 28 and float housing 16 may be circular or non-circular such as square.

The armature housing 20 includes an elongate cylindrical bore 36 and a plurality of armature coils 38 that skirt the elongate cylindrical bore 36. The stem 25 is received by and extends within the elongate cylindrical bore 36. The armature coils 38 collectively form an armature 27. The top 30 and the base 32 of the float housing 16 provide end of travel stops and thereby define a length of travel of the float 24 along the float housing 16. In this example, the top 30 and the base 32 each include magnetic elements 40a, 40b, respectively, that are arranged to repel correspondingly arranged magnetic elements 42a, 42b of the float 24 so as to provide magnetic braking at the travel limits.

The relative length of the float housing 16 and stem 25 of the second section 14 is such that at the lower travel limit, as shown in FIG. 1a, the stem 25 is wholly received by the elongate cylindrical bore 36 of the armature housing 20, and at the upper travel limit, as shown in FIG. 1b, a section of the stem 25 carrying some of the magnetic elements 26 still remain within the elongate cylindrical bore 36 of the armature housing 20.

In this example, the one or more apertures 22 are provided in the form of a plurality of circular apertures 23 provided at regular intervals substantially circumferentially around and along normally wetted wall of the cylindrical body 28 of the float housing 16. However, it is noted that other shapes and arrangements of aperture 22 are possible such as oval shaped, rectangular and slotted apertures. The function of the aperture 23 is to allow rapid ingression and egression of water between the float 24 and the float housing 16 so that the float 24 glides upwardly and downwardly therein in response to the rise and fall of the water surface. It is noted that sections 66a, 66b proximate the top 30 and the base 32 of the float housing 16 may be free of apertures 22, 23 so as to provide at least a partial seal between the float 24 and float housing 16 and thereby providing some pneumatic braking between the float 24 and the float housing 16.

Figure 3:
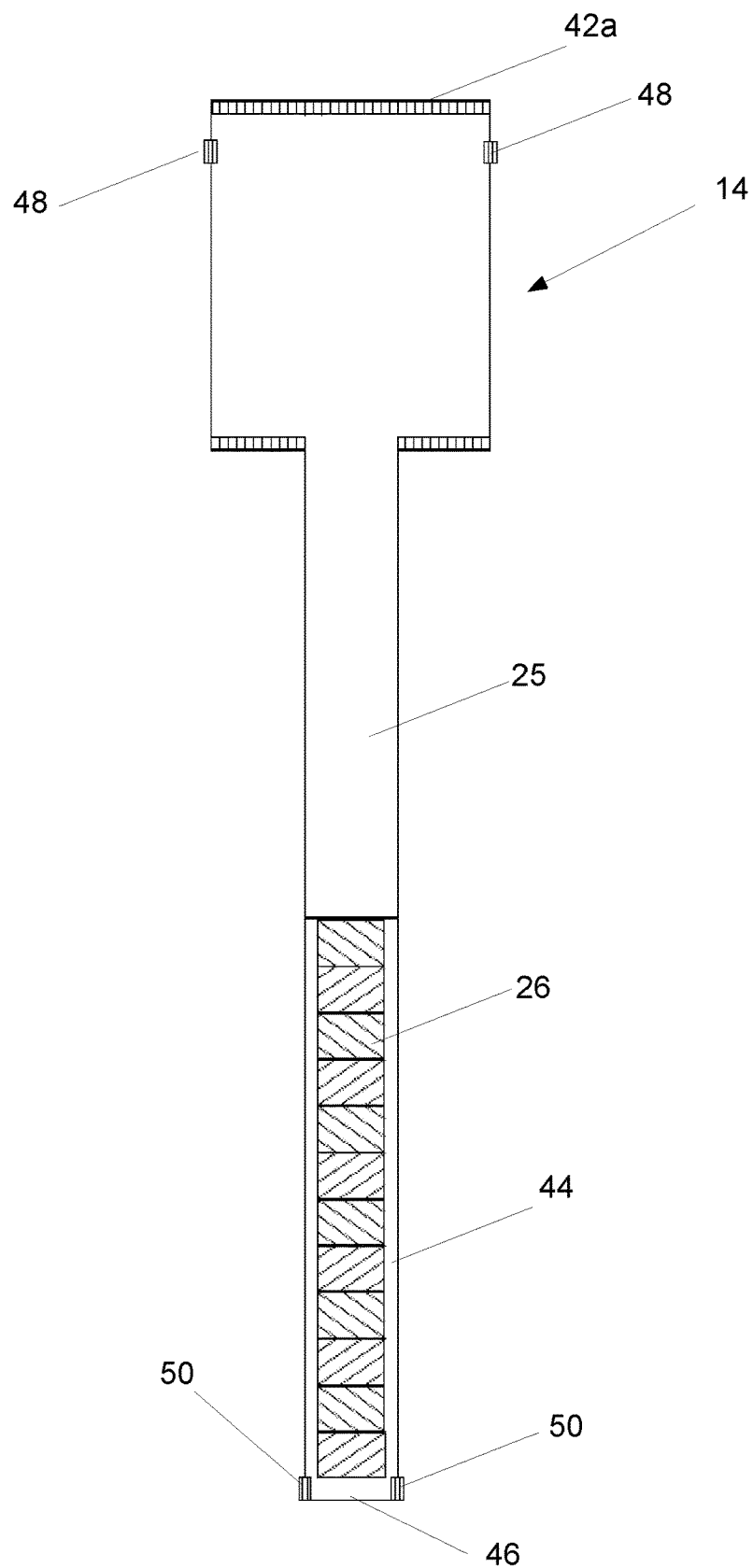
FIG. 3 is a side view illustrating a second section of the apparatus having a float and an stem extending therefrom.

Referring now additionally to FIG. 3, the second section 14 is shown in more detail. In this example, the magnetic elements 26 of the stem 25 extend along a distal section 44 of the stem toward its free end 46. However, the relative length of the magnetic elements 26 may be modified. The magnetic elements 26 may be provided in an alternate sequence of polarities or in other examples every second magnetic element may be missing.

Figure 4A:
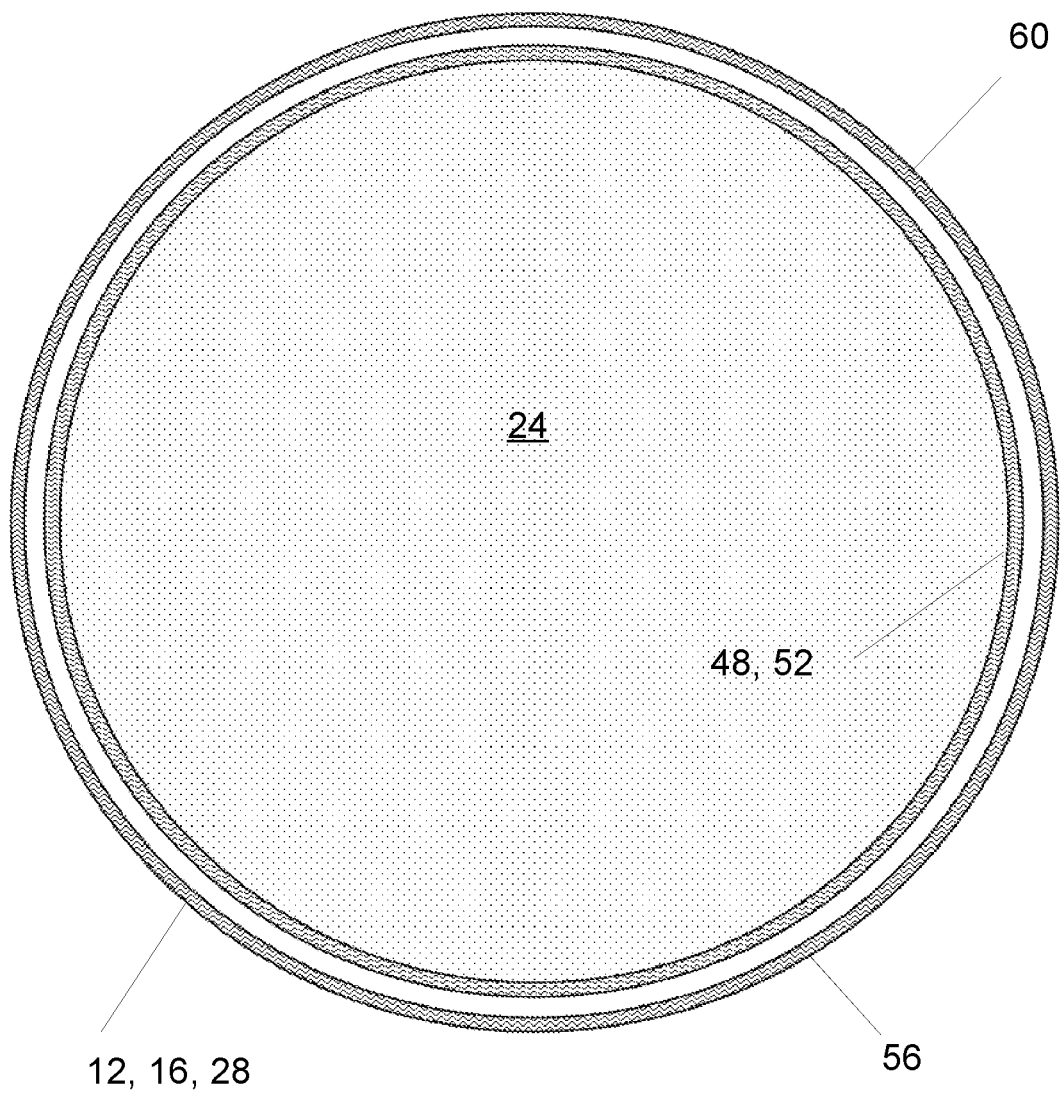
FIG. 4a is a sectional end view illustrating the float section within the float housing.
Figure 4B:
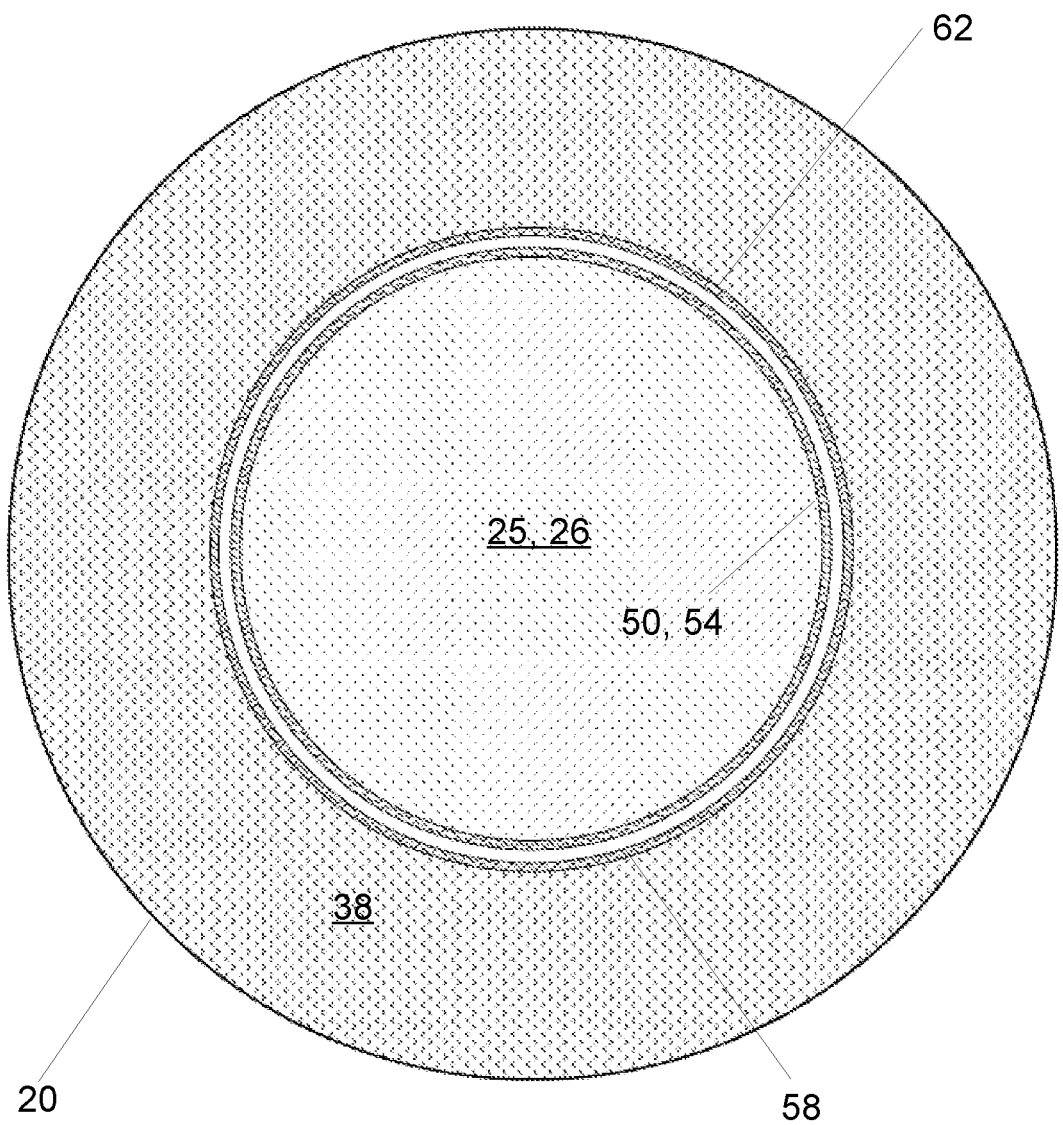
FIG. 4b is a sectional end view illustrating a stem section within the armature housing.

The second section 14 includes upper and lower pairs of friction reducing elements 48, 50 that assist the second section 14 to glide relative to the first section 12. More specifically, in this example, the friction reducing elements 48, 50 are provided in the form of a magnetic bearing arrangement 49 including circumferential upper and lower magnetic bearings or rings 52, 54 that react with a circumferential magnetic bearings or rings 60, 62 located at or within an inner circumferential surface 56 of the body 28 of the float housing 16 and an inner circumferential surface 58 of the elongate cylindrical bore 36 of the armature housing 20, respectively and as best shown in FIGS. 4a and 4b. The magnetic bearings or rings 52, 54, and the magnetic bearings or rings 60, 62 may be formed of arcs or magnetic segments.

This arrangement 49 allows the first and second sections 12, 14 to move with relatively lower friction. Moreover, the use of magnetic bearing arrangements 49 avoid or reduces the maintenance issues associated with mechanical bearings.

Although, it is envisaged that some examples may include a mechanical bearing arrangement.

Figure 5:
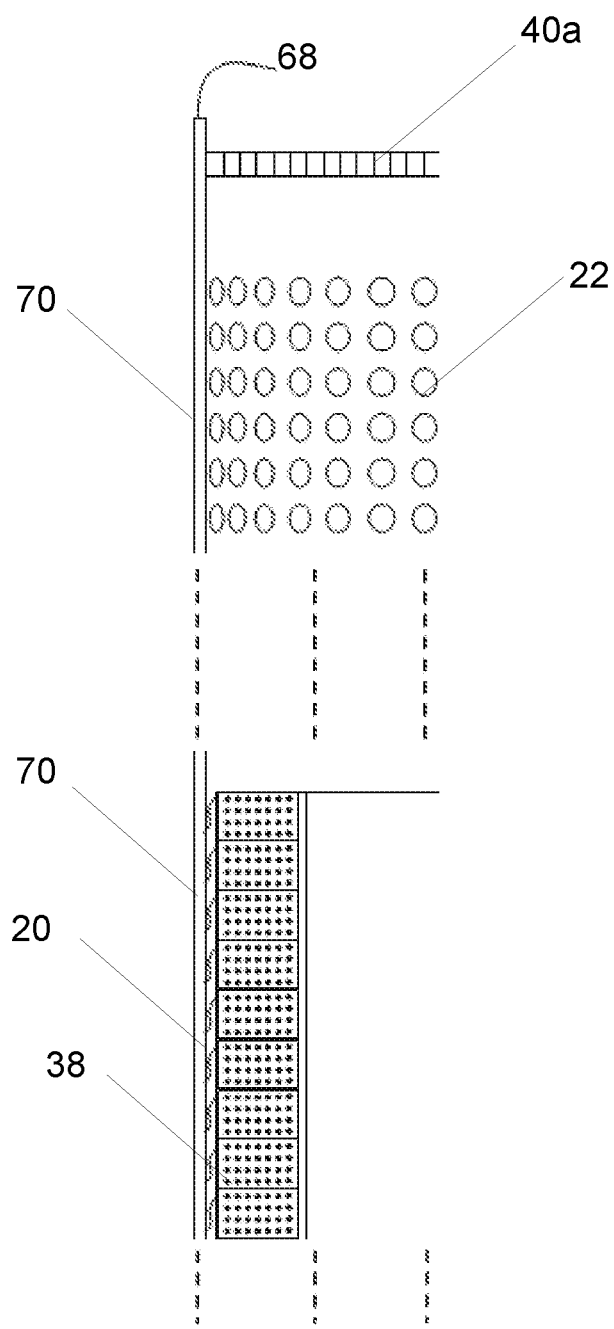
FIG. 5 is a partial side view diagram illustrating electrical connections of the apparatus.

Referring now to FIG. 5, the armature coils 38 are located inside of the armature housing 20 of the first section and produce electricity as the piston 25 of the second section 14 moves upwards and downwards. The coils 38 are connected via and inside an electrical channel 70, and electrical wires 68 run inside the electrical channel 70, to provide an electrical connection for a consumer. In this example, the electrical channel extends along the first section 12 from a bottom 73 of the armature housing 20 to a top 74 of the float housing 16. The armature coils 38 may be arranged contiguously, therefore maximizing volume/space usage and power output. However, in some examples there may be spacing between the armature coils 38. The electrical wires for the user, are accessible over the apparatus 10, and may be linked to the electrical wires of other apparatuses. All electrical connections may be made overhead.

Figure 6:
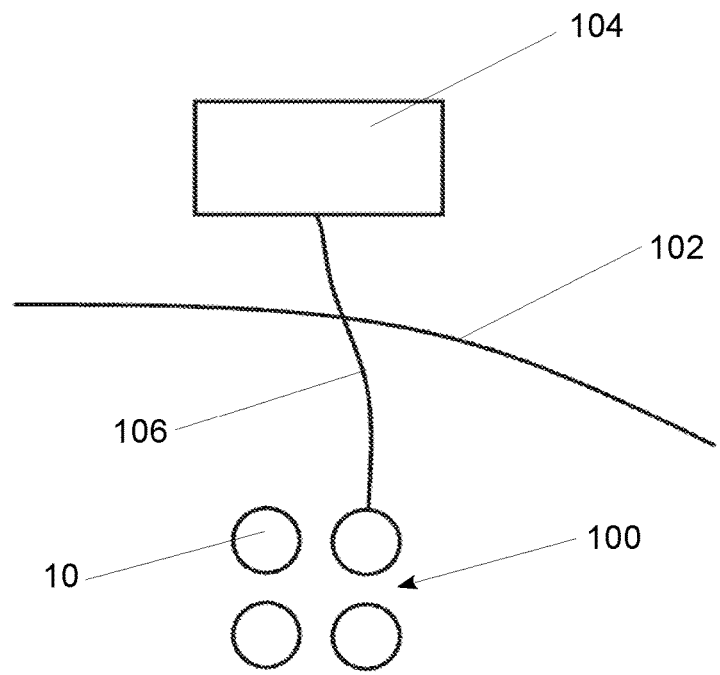
FIG. 6 is a idealised top view illustrating an first example array of the apparatuses connected to shore.
Figure 7:
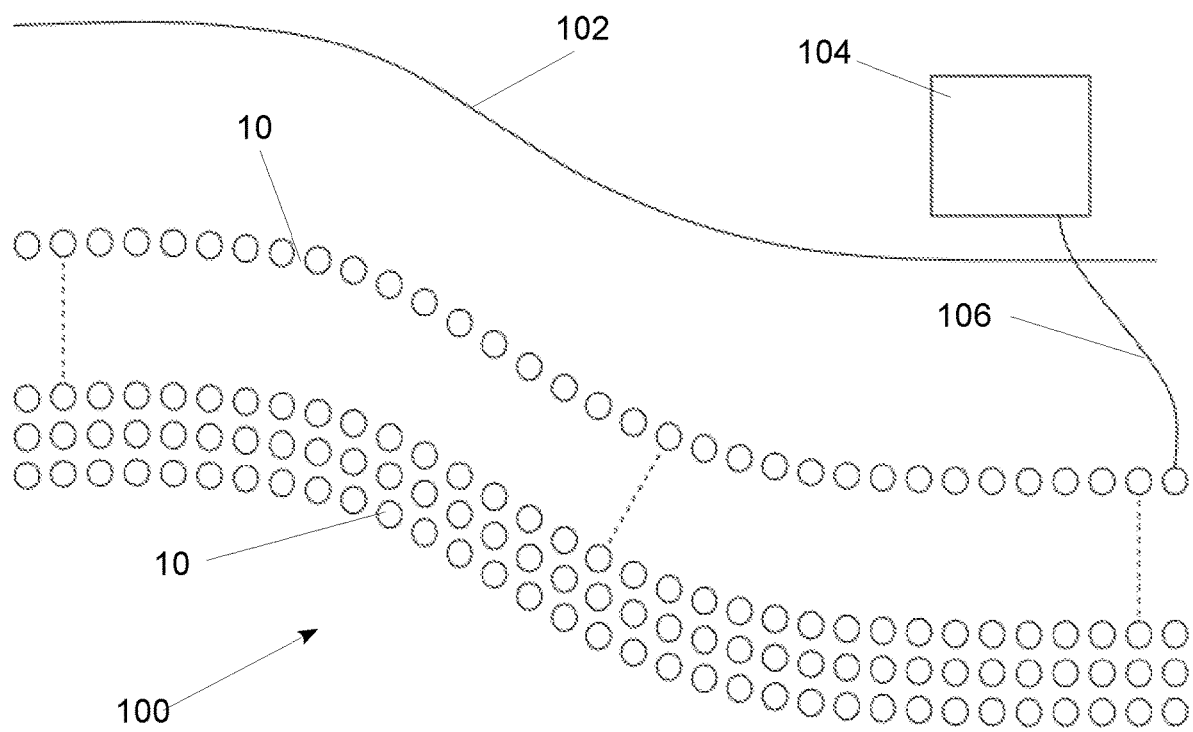
FIG. 7 is an idealised top view illustrating a second example array of the apparatuses connected to shore.

Referring now to FIGS. 6 and 7, the apparatus 10 may be provided as part of small or large arrays 100 or farms in which pluralities of the apparatuses 10 are placed near to one another along a seashore/coastline 102. Each of the apparatuses 10 are mechanically and electrically connected within the array 100. The array 100 is electrically connected to an electrical collecting station 104 via one or more cables 106. The small or large arrays 100 may in some examples connect to a ocean rig such as an oil rig rather than a shore based installation.

Advantageously, there has been described an apparatus for generating energy from ocean waves. The apparatus includes a first generally fixed outer section that substantially encases and protects a floating second inner section. The first and second sections each carry one or more magnetic elements or armature coils to generate electricity due to relative motion between the first and second sections. To increase efficiency friction reducing elements may be provided between the first and second sections, and one or more of magnetic and pneumatic brakes may be provided between a float of the second section and a float housing of the first section to provide damped end of travel stops. The float housing of the first section includes a plurality of apertures to allow the ingress and egress of water thereby allowing travel of the float.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

What is claimed is:

1. An apparatus for generating energy from ocean waves, the apparatus comprising:
 a first section coupled to a sea floor and a second section slidably moveable within the first section;
 an energy generating region comprising an armature housing;
 a moving sealed section and a sealed section coupled to the sea floor;
 an aperture disposed within the armature housing;
 wherein the first section comprises an upper housing located toward or at a sea surface and the armature housing extending from the upper housing toward the sea floor, wherein the upper housing contains one or more apertures disposed on walls of the upper housing configured to receive water and thereby a water level within the upper housing is substantially similar to or identical to the sea surface and the apparatus is partially submerged under the sea surface;
 wherein the second section comprises a float slidably received by the upper housing and a stem carrying one or more magnetic elements that extends from the float and thereby the stem is receivable by the armature housing;
 wherein the float travels in a substantially vertical direction within the upper housing in response to movement of the sea surface and thereby facilitating movement of the stem, wherein the movement of the stem inside the armature housing generates energy; and
 wherein the moving sealed section slides into the sealed section coupled to the sea floor in response to the upper housing receiving water, thereby generating energy.

2. The apparatus according to claim 1, wherein the upper housing is cylindrical and the one or more apertures are substantially circumferentially around and along a normally wetted wall of the upper housing.

3. The apparatus according to claim 1, wherein the float is substantially encased by the upper housing.

4. The apparatus according to claim 1, wherein the second section is substantially encased by the first section.

5. The apparatus according to claim 1, wherein the upper housing is cylindrical and the float is provided in the form of a cylindrical piston shaped to fit with and be slidable within the upper housing, the stem being carried therewith and slidable within the armature housing.

6. The apparatus according to claim 1, wherein opposing ends of the upper housing define end of travel limits of the float.

7. The apparatus according to claim 6, wherein the float and the upper housing are arranged to provide damping between one another toward the end of travel limits.

8. The apparatus according to claim 7, wherein the float and the upper housing are arranged to provide an at least partial seal with one another toward the end of travel limits and thereby providing pneumatic damping.

9. The apparatus according to claim 8, wherein the at least partial seal comprises sections corresponding to one or more apertures omitted from sections of top and bottom portions of the upper housing proximate the end of travel limits.

10. The apparatus according to claim 7, wherein the float and the upper housing comprises one or more magnetic elements arranged to repel one another toward the end of travel limits.

11. The apparatus according to claim 1, wherein the first section and second section have friction reducing elements there between.

12. The apparatus according to claim 11, wherein the friction reducing elements are provided in the form of one or more magnetic elements between the first section and the second section.

13. The apparatus according to claim 11, wherein the friction reducing elements comprise one or more magnetic elements located at a side wall of the float and a side wall of the stem.

14. The apparatus of claim 1, wherein the armature housing comprises a plurality of armature coils.

15. The apparatus according to claim 14, wherein the plurality of armature coils is arranged contiguously.

16. The apparatus according to claim 1, wherein the stem comprises a plurality of magnetic elements arranged in alternate polarities at least partially along length of the stem.

17. A plurality of apparatuses for generating energy from ocean waves, the plurality of apparatuses comprising:
two or more apparatuses, wherein each apparatus of the two or more apparatuses comprises:
a first section coupled to a sea floor and a second section slidably moveable within the first section;
an electric generator region comprising an armature housing;
a moving sealed section and a sealed section coupled to the sea floor;
an aperture disposed within the electric generator region;
wherein the first section comprises an upper housing arranged to be located toward or at a sea surface and the electric generator region extending from the upper housing toward the sea floor, wherein the upper housing contains one or more apertures disposed on walls of the upper housing configured to receive water and thereby a water level within the upper housing is substantially similar to or identical to the sea surface and the plurality of apparatuses is partially submerged under the sea surface;
wherein the second section comprises a float slidably received by the upper housing and a stem carrying an electric generation section that extends from the float and thereby the stem is receivable by the electric generator;
wherein the float travels in a substantially vertical direction within the upper housing in response to a movement of the sea surface and thereby facilitating a movement of the stem inside of the electric generator housing to generate energy; and
wherein the moving sealed section slides into the sealed section coupled to the sea floor in response to the upper housing receiving water, thereby generating energy.

18. The plurality of apparatuses according to claim 17, wherein the plurality of apparatuses is operationally connected to an array of wave apparatuses.

19. The plurality of apparatuses according to claim 17, wherein the plurality of apparatuses is deployed upon the sea surface and operationally connected to an energy collection station.

20. The plurality of apparatuses according to claim 19, wherein the energy collection station collects energy from the sea surface, wherein the energy is generated by the plurality of the apparatuses.

* * * * *